United States Patent [19]

Milch

[11] Patent Number: 4,933,779
[45] Date of Patent: Jun. 12, 1990

[54] IMAGE SCANNER APPARATUS OF THE DRUM TYPE HAVING AN EFFICIENT LINE-OF-LIGHT ILLUMINATION SYSTEM

[75] Inventor: James R. Milch, Pittsford, N.Y.

[73] Assignee: Eastman Kodak Company, Rochester, N.Y.

[21] Appl. No.: 241,687

[22] Filed: Sep. 8, 1988

[51] Int. Cl.⁵ ............................................. H04N 1/08
[52] U.S. Cl. ................................. 358/489; 358/491; 358/492
[58] Field of Search ............... 358/289, 290, 291, 75, 358/489, 491, 492; 355/47, 75; 350/431, 6.1, 6.8

[56] References Cited

U.S. PATENT DOCUMENTS

| | | | |
|---|---|---|---|
| 2,878,095 | 1/1953 | Hackenberg et al. | 358/291 |
| 3,935,584 | 1/1976 | Fels | 358/289 |
| 4,123,135 | 10/1978 | Rabedeau | 350/6.8 |
| 4,186,431 | 1/1980 | Enzel et al. | 362/223 |
| 4,278,995 | 7/1981 | Fearnside et al. | 358/54 |
| 4,318,122 | 3/1982 | White | 358/75 |
| 4,440,491 | 4/1984 | Takahama | 358/291 |
| 4,525,749 | 6/1985 | Maeda et al. | 358/290 |
| 4,556,901 | 12/1985 | Sakamoto | 358/289 |
| 4,754,325 | 6/1988 | Ishida et al. | 358/290 |
| 4,806,946 | 2/1989 | Ohnishi | 350/6.8 |
| 4,812,631 | 3/1989 | Hiramatsu | 235/468 |

FOREIGN PATENT DOCUMENTS 0016673 1/1986 Japan .

Primary Examiner—James J. Groody
Assistant Examiner—Kim Yen Vu
Attorney, Agent, or Firm—Dennis P. Monteith

[57] ABSTRACT

Image scanner apparatus includes a drum having an aperture rotatable about an axis. A mechanism clamps a border of an exposed photographic film to the drum, with the film image aligned with the aperture substantially in a surface of revolution of the drum. A source of diffuse light, disposed between the rotational axis of the drum and its surface of revolution, projects a line of diffuse illumination through the aperture directly onto the film image. Lens apparatus, interposed between the surface of revolution of the drum and a linear image sensor, focuses a line of diffuse light, modulated in accordance with the film image, onto the sensor.

1 Claim, 5 Drawing Sheets

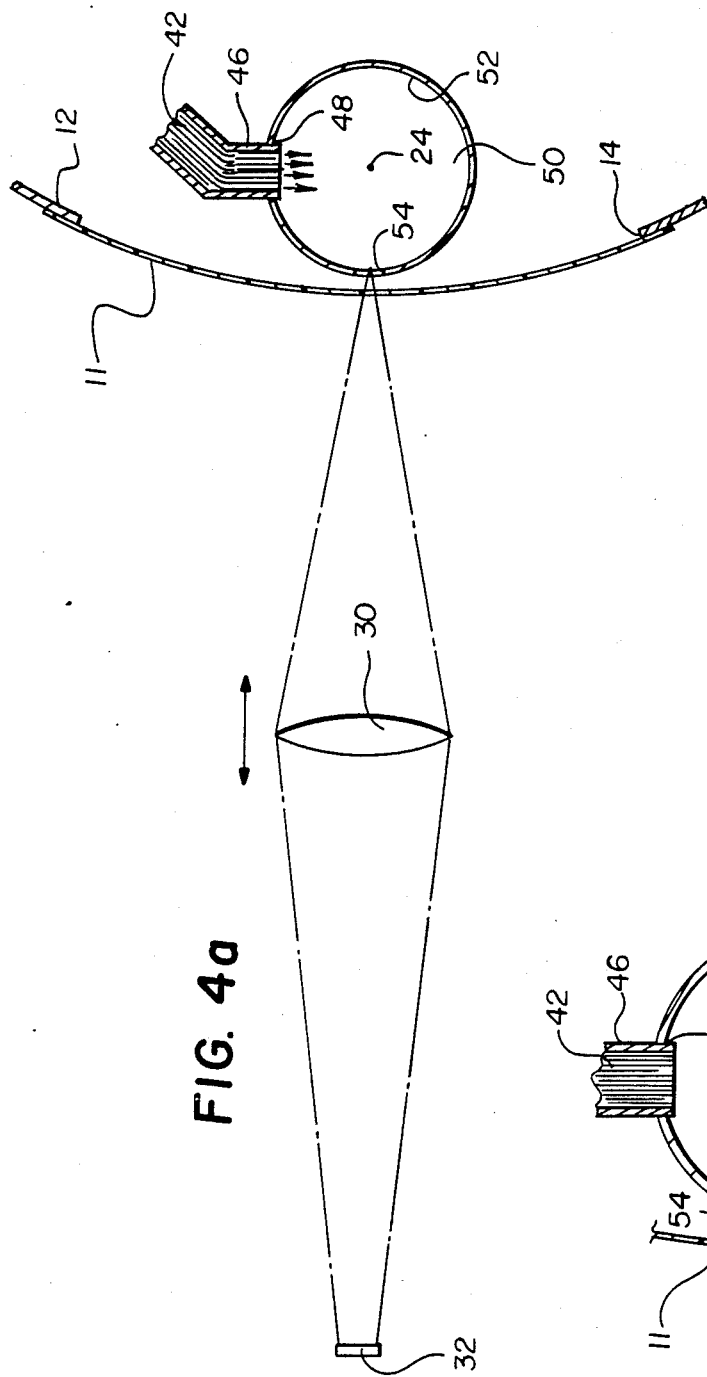
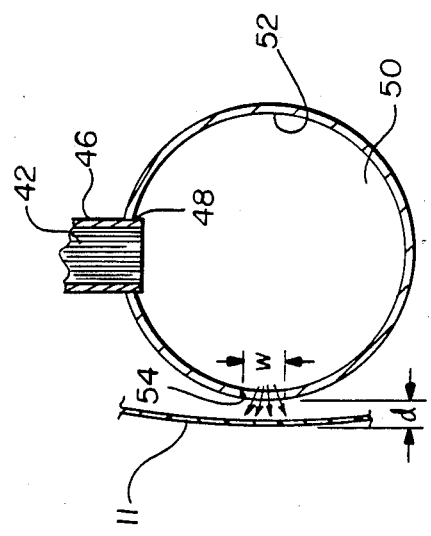
FIG. 4a
FIG. 4b

IMAGE SCANNER APPARATUS OF THE DRUM TYPE HAVING AN EFFICIENT LINE-OF-LIGHT ILLUMINATION SYSTEM

BACKGROUND OF THE INVENTION

1. Field Of The Invention

The present invention relates to image scanning apparatus.

2. Description Of The Prior Art

Image scanning is a process of converting an image recorded on a photosensitive sheet, such as photographic film, to an electronic image. Scanning, as such, is commonly employed as a first step in the transmission of an image from one storage medium to another, or in the enhancement or the analysis of the image prior to its transmission.

With a photographic film held in a given plane, an image scanner measures the optical density of the film by illuminating it with light of known intensity and measuring the amount of light transmitted through, or reflected from, the film. In doing so, the scanner effectively divides the image recorded on the film into discrete picture elements, or pixels, and assigns to each a number or value representing an average density for each pixel. Commonly, the pixels are arranged in rows and columns to form a two-dimensional grid with the density of each pixel corresponding to a relatively small portion of the overall image.

There are various image scanning systems known in the art. Such systems are of two basic types, i.e. so-called flat-bed scanning and so-called cylindrical or drum scanning. With film of a large format, e.g. greater than 35 mm, flat-bed scanner apparatus requires a support to maintain the film precisely in a predetermined flat plane. To that end, film is commonly sandwiched tightly between an opposing pair of glass plates. With drum scanner apparatus, a clamping mechanism serves to maintain the film in a curved plane tightly against the surface of the drum. These arrangements, however, suffer from a disadvantage in that the support for the film—glass plates with flat-bed apparatus and the drum with cylindrical apparatus—can create optical interference patterns, known as Newton rings, in the illumination applied to the film.

There are procedures used in the art, with a moderate degree of success, in the eliminating of Newton rings. For example, etched glass, known as anti-Newton glass, can be employed. Such glass, however, is expensive due to its added cost of manufacture. Two other procedures include applying oil to each film sheet, and the use of the so-called "cornstarch method". The former requires that the film support be wiped completely clean of oil each time a different film is to be scanned. Cornstarch works in a hit or miss manner to eliminate Newton rings; thus, that method can be time-consuming in order to obtain fully satisfactory results.

In addition to problems associated with Newton rings, an illumination system of an image scanner should be efficient. It is important, for example from the standpoint of scanning speed, that light not be wasted. That is, light should be directed, to the extent possible, onto only the pixel (or pixels) whose optical density is being measured at that particular time.

The spatial resolution of film determines scene detail—the amount of information—recorded. For example, Ektachrome 64 film, manufactured by Eastman Kodak Company, exposed with an excellent lens can record information to 100 cycles per millimeter (mm). In this case, film pixel pitch should be five microns ($\mu$) to extract all information.

However, information of such minute detail —a few wavelengths of light—imposes stringent requirements on an illumination system. It can be appreciated by those skilled in the image scanner art that it may not be possible, particularly with a high-definition film, to concentrate light solely on pixels of interest, to the total exclusion of other pixels. Nevertheless, light should be directed, to the fullest extent possible, onto only the pixel or pixels whose density is being measured. To some extent, the aforementioned glass plates of flat-bed apparatus and the drum of cylindrical apparatus disperse incident light, thereby contributing to inefficiency.

Although unwanted dispersion can be wasteful, specular illumination, i.e. light concentrated in a small solid angle, highlights particles and scratches on the film surface. Diffuse illumination, on the other hand, so long as it is not wasted, is highly preferred since it, contrary to specular light, reduces granularity due to particles on the film surface and hides film scratches. The latter feature is particularly important when the cosmetic quality of the image is critical.

Further desirable characteristics of an image scanner are the absence of electronic flare and the suppression of cross talk. The former arises when light is projected onto pixels distant from the one(s) whose density is being measured; cross talk results from light on a neighboring pixel. Thus, the illumination system of an image scanner is subject to the somewhat conflicting requirements of the need for diffuse illumination while using light in an efficient manner to enhance scanner speed and to reduce flare and cross talk.

SUMMARY OF THE INVENTION

In view of the foregoing, it is an object of the present invention to provide image scanner apparatus that is free of Newton rings and that is of relatively high speed while utilizing diffuse illumination in an efficient a manner as possible to limit cross talk and flare.

Underlying the concept of the present invention is the recognition that bending a sheet of photographic film makes the film more rigid. Film of a size that would normally require support to maintain it in flat plane, e.g. film of a format greater than 35 mm, need not be supported, when bent, to maintain it in a curved circular plane.

With this recognition in mind, the object of the invention, insofar as it relates to the eliminating of Newton rings, is achieved with image scanner apparatus of the cylindrical or drum type in which a rotatable drum (or cylinder) has an aperture on its curved surface corresponding to the size of an image to be scanned. A clamping mechanism secures a border of the film (non-image-bearing portion) to the curved surface of the drum, with the image-carrying portion of the film being in registration with the aperture of the drum.

Further toward achieving the object of the invention, insofar as it relates to using diffuse illumination in an efficient manner, an optical converter, located between the rotational axis of the drum and its surface of revolution, projects a line of diffuse illumination through the aperture on the drum directly onto the film image plane, to illuminate an entire row of film pixels at a time. A lens, interposed between the surface of revolution of the drum and a linear array of light-responsive elements, focuses light, modulated in accordance with the row of pixels illuminated, onto the light-sensitive elements.

Thus, image scanner apparatus of the drum type both illuminates and detects an entire row of film pixels at a time. The optical converter is arranged relative to the film image plane so that the light line projected is relatively concentrated, without sacrificing its diffusive characteristic. Accordingly, cross talk and flare are limited. Not only are multiple pixels illuminated and detected simultaneously, the diffuse light reduces film granularity and obfuscates film scratches.

With the film bent in accordance with the curvature of the drum, its image-carrying portion, although not directly supported, is maintained precisely in a predetermined curved plane defined by the surface of revolution of the drum. Accordingly, diffuse light impinges directly onto the film image, without first having to be transmitted through a film support member. This provides an improved arrangement for the eliminating of undesired Newton rings.

Furthermore, because the film image is unsupported, scanner illumination is not unduly dispersed and, accordingly, is used more efficiently since it is more readily concentrated onto the pixels whose densities are being measured.

These advantages, as well as other advantages of the invention, will become more apparent in the detailed description of a preferred embodiment presented below.

BRIEF DESCRIPTION OF THE DRAWINGS

The invention will be described with reference to the accompanying drawings, wherein:

FIGS. 4a and 4b are partial side elevation views illustrating the arrangement between the output of the converter apparatus and the film image plane.

DETAILED DESCRIPTION OF A PREFERRED EMBODIMENT

Figure 1:
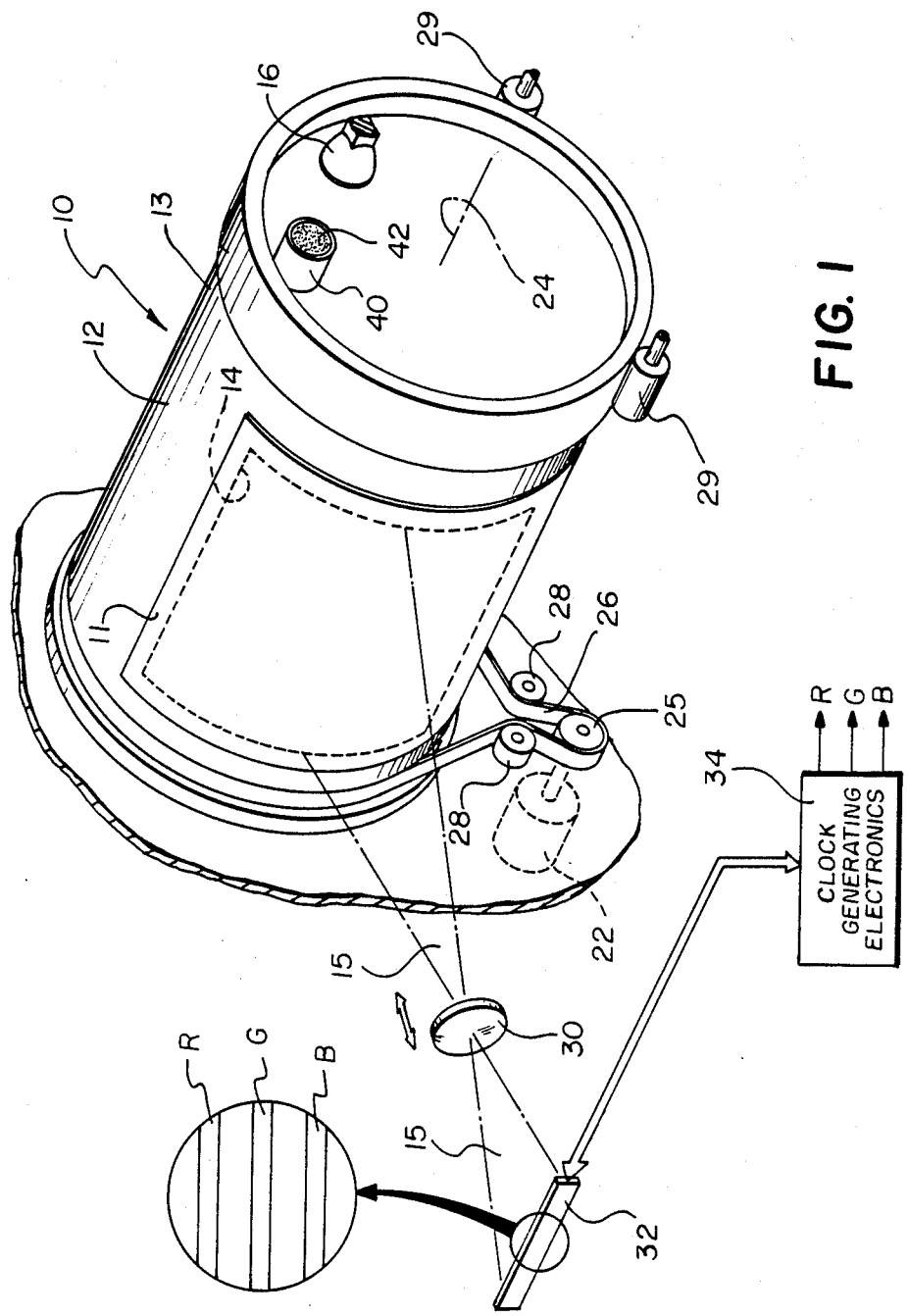
FIG. 1 is a perspective view of image scanner apparatus of the drum type in accordance with the present invention.

An object of the invention is to provide image scanner apparatus that is free of Newton rings and that is of relatively high scanning speed while employing diffuse illumination in an efficient manner to limit cross talk and flare. Insofar as the eliminating of Newton rings is concerned, my inventive contribution takes advantage of the fact that photographic film is more rigid when bent. To that end, FIG. 1 shows image scanner apparatus 10 of the drum type, in accordance with a preferred embodiment of the invention. Film 11 to be scanned is bent to the curvature of a film-receiving surface 12 of a hollow drum 13. I take advantage of the rigidity of bent film by mounting it so that the film image is free of drum support. More specifically, the drum 13 has an aperture 14 on its curved surface 12 that is larger than the area of the film image. Film-holder means, described in detail hereinafter, serves to mount film 11 in alignment with the aperture 14. By means made apparent hereinbelow, illumination for scanning the film image is projected through aperture 14—via free space—directly onto the film image. Thus, illumination impinging on film 11 is free of Newton rings; furthermore, since the film image is aligned with aperture 14, impinging illumination is not dispersed unnecessarily.

The object of the invention also requires image scanner apparatus of relatively high speed. To that end, light for scanning the film image is provided in the form of a line of diffuse illumination, denoted 15. All pixels in a given row of the film image are illuminated and detected simultaneously to enhance the speed at which an image is scanned.

To that end, a lamp 16, preferably of the halogen-tungsten type, provides light used for illuminating film 11. An optical converter 17, described in detail hereinbelow with reference to FIGS. 2 through 6, serves to form the line of diffuse light.

The entire film image is scanned by moving film 11 one row of pixels at a time through the light line 15. To that end, a stepper motor 22 serves to rotate the drum 13 in small increments about a central axis 24. For that purpose, the motor 22 rotates the drum 13 in a line-scan direction—from the top of a film image to the bottom—via a driven pulley 25 and an endless belt 26 wrapped around the drum in an Ω configuration. A pair of idlers 28 functions to control belt tension. Rotatable cam followers 29 serve to locate the drum 13.

Lens apparatus 30 functions to focus an image of one row of film pixels at a time onto a charge coupled device (CCD) linear image sensor 32. An operator sets lens apparatus 30 for a variety of magnifications to control the width of the film image scanned.

In a preferred embodiment, the image sensor 32 includes an overlay comprising three parallel arrays of color filters—red (R), green (G) and blue (B). This "tri-linear" image sensor 32 further includes three corresponding parallel output registers which are coupled respectively to an output of one of the color filter arrays. Thus, the output of one of the registers corresponds to an R video signal, a second register to a G video signal, and the third register to a B video signal.

Clock generating electronics 34 function to control the CCD sensor 32 and to process its output signals to produce in a known manner a high-resolution video signal corresponding to the film image. The clock generating electronics 34 applies the R, G and B video signals to circuitry (not shown) for subsequent operations, such as to produce positive R, G and B color signals to provide a composite video signal for display on a video monitor (also not shown). A tri-linear image sensor array and corresponding clock generating electronics 34 of the type disclosed herein are the subject of U.S. Pat. No. 4,278,995 entitled COLOR LINE SENSOR FOR USE IN FILM SCANNING APPARATUS, assigned to the assignee of this invention and the disclosure of which is incorporated herein by reference.

FIGS. 2, 3, 4a, 4b, 5 and 6 illustrate the aforementioned converter 17 for illuminating film 11 with a line of diffuse light projected through the aperture 14. To that end, the converter 17 is located inside the drum 13 between its axis of rotation 24 and its surface of revolution.

For the purpose of forming a line of light, a fiber optic bundle 40, also shown in FIG. 1, serves to transform a pencil-shape beam of specular light, provided by the lamp 16, into a flat relatively wide beam, i.e., a beam of generally line-like shape. To that end, the input end of the bundle 40 is aligned with the lamp 16, the diameter of the bundle being substantially equal to the diameter of the specular light beam. The optic fibers, denoted 42, are unbundled inside a housing 44 and arranged with their respective output ends distributed along nose 46 which faces downwardly within an elongate rectangular entrance slot 48 of a cylindrical diffusing tube 50. Thus, light from the lamp 16 is spread out and thereby enters the diffusing tube 50 through the slot 48 which extends longitudinally from one end of the tube to the next.

The tube 50 serves a dual function of diffusing light received and projecting a relatively thin line of such diffuse illumination onto the film image plane of the scanner apparatus 10. To diffuse the light received, the inside curved wall 52 of the tube 50 is preferably painted with a diffuse, highly reflective paint. Alternatively, a thin layer of white polyester film, manufactured by ICI Americas, Inc. of New Castle, Del., may cover the wall 52 for diffusing light.

An elongate rectangular exit slot 54, approximately ninety degrees (90°) from the entrance slot 48 and generally parallel with the axis 24 of the drum 13, serves for directing a line of diffuse illumination toward the film image plane. Light entering through the slot 48 is diffused by reflection of the inside wall 52 and exits through the slot 54.

FIG. 4 illustrates two effects associated with the position of the diffusing tube 50 relative to the film image plane. First, the larger the distance that the slot 54 is from the film image plane, the distance denoted d, the greater is the height of the film area over which the light line 15 is distributed. If the height of this film area is too large, light is wasted. Second, the angular spread of light, seen by a point on the film, decreases with distance d. If this angular spread is too small, light impinging on the film is no longer diffuse.

So that light projected onto the film is diffuse, without being unduly wasted, the exit slot 54 is positioned from the film plane a distance d which is approximately one-half the width, w, of the slot. In accordance with a preferred embodiment of the invention, the slot 54 is located approximately 1/20 of a centimeter from the film plane; thus, the width w of the slot 54 is approximately 1/10 of a centimeter.

As disclosed previously herein, Kodak Ektachrome 64 film exposed with an excellent lens can record information to 100 cycles per millimeter (mm). In this case, film pixel pitch should be 5 microns ($\mu$) to extract all information. With such a high-definition film, it is not possible to control the width w of the slot 54 and the distance d to such minute dimensions to illuminate only one row of film pixels at a time. Nevertheless, by controlling the size of the slot 54 and its location relative to the film plane, and by mounting the film so that illumination can be projected through free space directly onto the film image, diffuse illumination is employed efficiently to limit cross talk and flare, while being free of Newton rings.

Referring briefly back to FIG. 1, it is shown generally therein that light from one end of the light line 15, for example the right-hand side, impinges on the opposite end, the left-hand side, of the tri-linear image array 32. It is known in the optics art that irradiance in an image plane decreases as the field angle of the image increases. In particular, irradiance falls off, in proportion to the fourth power of the cosine of the field angle—the angle defined by a line connecting the centers of an object and its image, and the optical axis of a lens. Other factors such as lens vignetting are also known to contribute to irradiance falloff.

The converter 17, in addition to forming a relatively narrow line of diffuse illumination at the film plane, further serves to condition the irradiance of the light line 15, in the film plane, so that irradiance along the linear image sensor 32 is uniform. In other words, the converter 17, insofar as falloff due to field angle is concerned, functions to adjust the amount of power radiated along the slot 54 so that the irradiance (power per unit area) at the object plane (the film image plane) varies approximately as the inverse of the fourth power of the cosine of the field angle.

Figure 5:
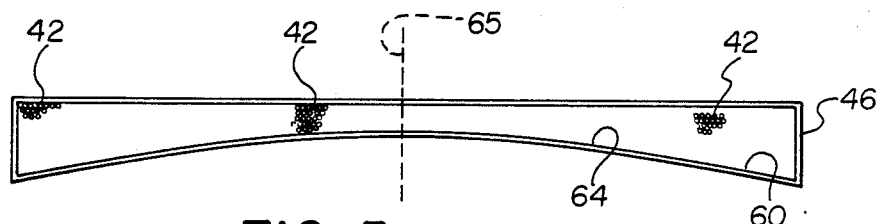
FIG. 5 is a planar view, along the line 5—5 of FIG. 3, of converter apparatus for conditioning the intensity of the line of diffuse illumination.

To that end, FIG. 5 shows that the nose 46 of housing 44 has an elongate symmetrically shaped slot 60 that widens progressively toward each end from its middle. In particular, an arcuate inside surface 64 of the nose 46 is shaped to progressively widen the slot 60 approximately with the reciprocal of the fourth power of the cosine of the field angle. In a preferred embodiment of the image scanner apparatus 10, the field angle of lens 30 is approximately ±12°. Accordingly, the width of the slot 60 at centerline 65, corresponding to a field angle of 0°, is approximately ninety percent (90%) of its width at both ends, which correspond, respectively, to field angles of plus and minus 12°.

FIG. 5 also shows that the fiber optics 42 are distributed throughout the slot 60. In particular, the respective outputs of the fiber optics 42 are arranged side by side generally in a common plane, to substantially fill the slot 60. In other words, the area of the slot 60 equals the cross-section of the fiber optic bundle 40.

Since each fiber is approximately of the same diameter (50$\mu$), the number of fibers in the slot 60, at any given distance on either side of centerline 65, is larger than the number of fibers at the centerline 65 by approximately the reciprocal of the fourth power of the cosine of the field angle corresponding to such given distance.

Figure 2:
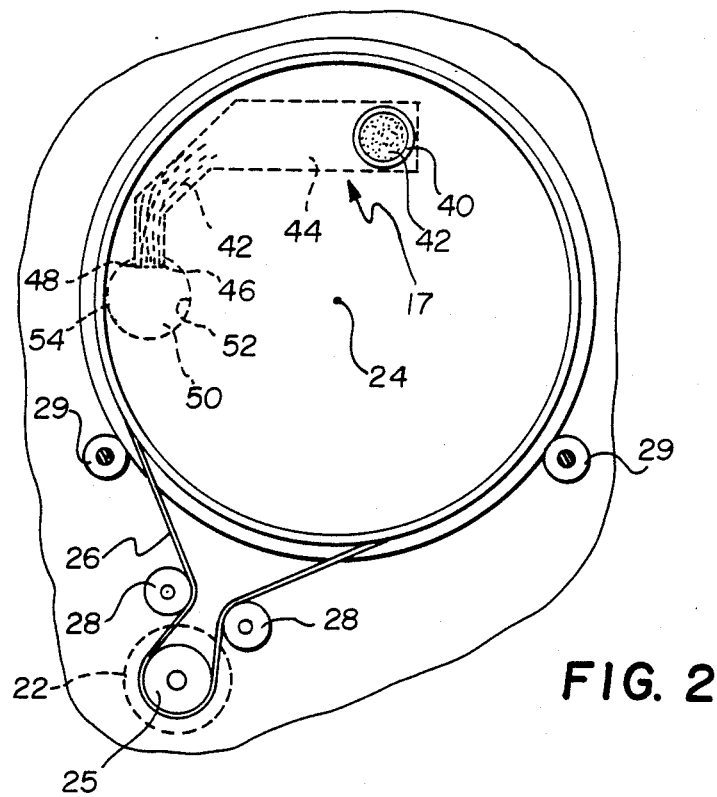
FIG. 2 is a side view of the image scanner apparatus of FIG. 1.
Figure 3:
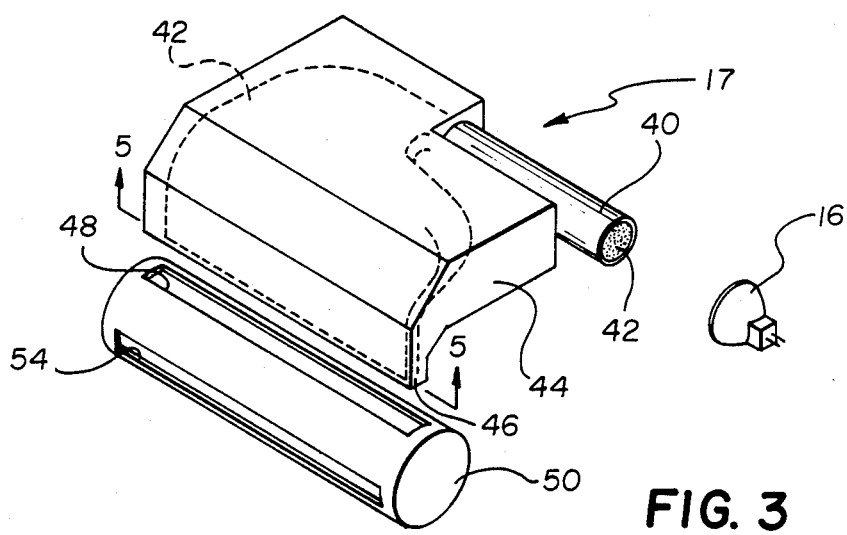
FIG. 3 is a perspective partially exploded view of optical converter apparatus for forming a line of diffuse illumination.

As is shown in FIGS. 2 and 4, the nose 46 fits within the entrance slot 48 of the diffusing tube 50. Accordingly, the light power per unit length of the slot 60, and therefore the amount of light entering the diffusing tube 50, varies along the slot 48 in proportion to the reciprocal of the fourth power of the cosine of the field angle.

Figure 6:
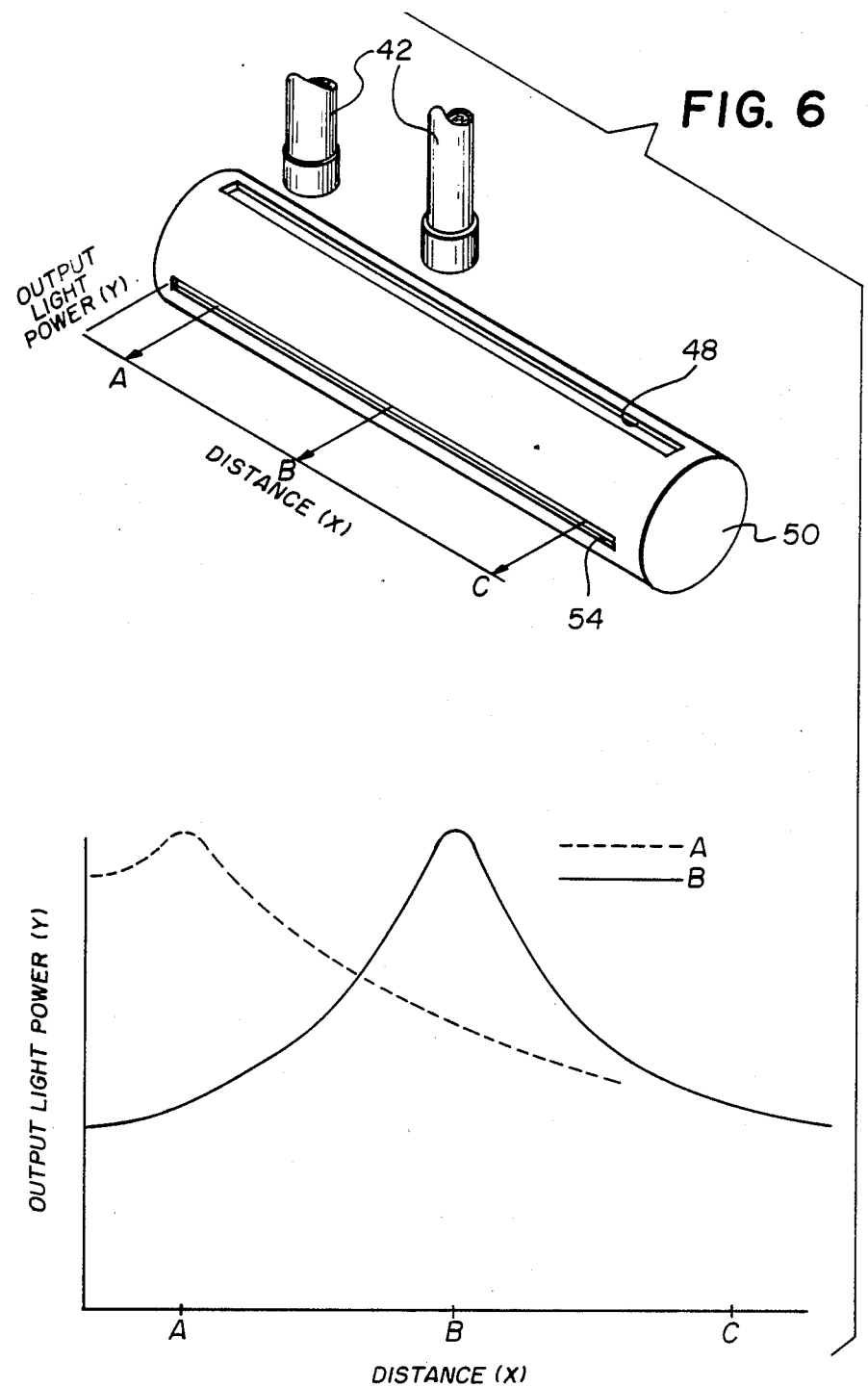
FIG. 6 is a perspective view useful in illustrating the operation of the converter apparatus.

Light, entering the diffusing tube 50 at a given point along the entrance slot 48, exits the diffusing tube 50 concentrated in a corresponding region of the exit slot 54. For example, FIG. 6 shows that light entering the tube 50 at a point A, near the end of the entrance slot 48, is concentrated in a region A at the corresponding end of the exit slot 54; similarly, light entering the tube 50 at a point B near the middle of the entrance slot 48 (in the linewise direction), exits the tube primarily from corresponding region B in the slot 54, with the shape of the distribution somewhat different from that at region A.

The shape of the output distribution, i.e. the impulse response, changes slowly as a function of the distance x. This shape can be computed using well-known Monte Carlo techniques, or, more straightforwardly, it can be measured. By sending light into slot 48 at different input points, and measuring the light distribution along slot 54 for each input, a set of impulse functions can be determined. Since the impulse response changes only slowly along the slot, it need be measured at only a course spacing, for example, a spacing equal to the radius of the tube 50.

Once each of the impulse responses is known, the output of slot 54 for any input distribution along the slot 48 can be calculated by the principle of superposition. The most straightforward method of doing this is to describe the shape of the output of fiber optics 42 by a function containing a small number of parameters. The shape of the slot 60, as shown in FIG. 5, can be described in this manner. Then, the output distribution can be calculated. If needed, the shape of the slot 60 is then varied to obtain an output distribution that provides uniform irradiance along the image sensor 32.

Figure 7:
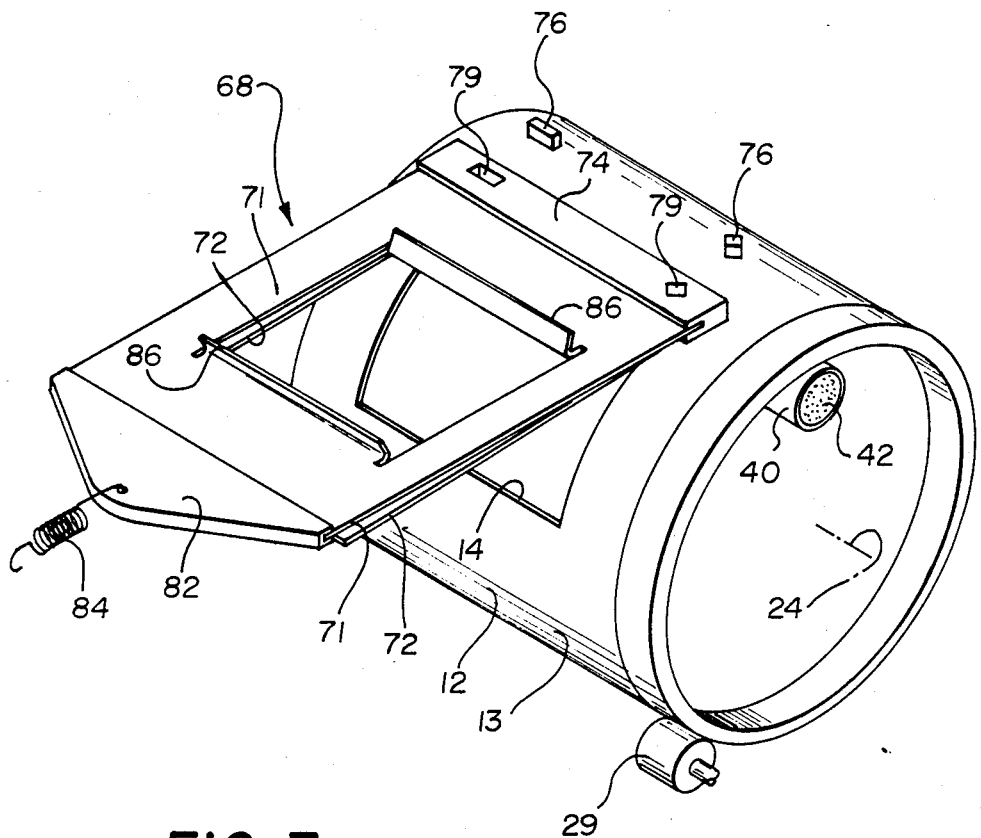
FIG. 7 is a holder for mounting film on the drum.

FIG. 7 shows apparatus 68 for loading film to be scanned onto the drum 13. To that end, film is sandwiched between a pair of flexible rectangular sheets 70, 71. Each sheet has a centrally aligned aperture 72 the dimensions of which correspond to the film image to be scanned. The film itself is somewhat larger than each aperture 72 so that only the border of the film—the non-image-bearing area —is actually sandwiched between the flexible sheets. A molded panel 74 holds the sheets 70, 71 together along corresponding outer edges to provide a clam-shell effect for placing the film between the sheets.

A pair of studs 76, attached to the drum 13, serves to clamp the panel 72 to the drum. To that end, each stud 76 is shaped to be received by a correspondingly shaped locating hole 79 in the panel 72.

A spring-loaded lever 82 attached to an edge of the top sheet 71, at the end opposite from the panel 72, serves for holding both sheets 70, 71 tightly against the curved surface 12 of the drum 13. To that end, the free end of a strong spring 84 is attached to a projection (not shown) on the drum 13. In doing so, the spring 84 pulls the lever 82, and thereby wraps sheet 71 directly, and sheet 70 under the influence of sheet 71, around the surface of the drum; with this arrangement, film sandwiched therebetween is bent to the curvature of the drum, with each aperture 72 aligned with the film image, which, in turn, is in registration with aperture 14 of the drum 13.

FIG. 7 also shows that the top sheet 71 has a pair of spaced upwardly facing flanges 86 immediately adjacent opposed edges of the aperture 72 that are parallel with central axis 24. Each flange 86 serves to make the sheet 71 more rigid along the corresponding edge of the aperture 72, and thereby more accurately holds film in a curved plane corresponding to the surface of revolution of the drum.

In operation, apparatus 10 scans continuous tone, color images recorded on reversal or negative films. A variety of film sizes can be handled, including films in a 120 and 135 format and film sheets of a size up to 20 by 25.4 centimeters. For handling the latter film size, the drum 13 has a circumference of approximately 63 centimeters, a longitudinal dimension of approximately 35 centimeters, and an aperture 14 of approximately 23 by 28 centimeters.

The size of aperture 72 of sheets 70 and 71 is determined by the film to be scanned. To that end, multiple pairs of sheets 70, 71, each pair having an aperture 72 of appropriate size, are used to mount the variety of films to be scanned.

An operator selectively position lens apparatus 30 to control the width of the image scanned. In a preferred embodiment, lens apparatus 30 is selected to provide three different magnifications—a film image of width up to 20 centimeters, a film width to 10 centimeters, and a film image width up to 5.7 centimeters.

Preferably, the linear image sensor 32 has 8000 pixels for each of the R, G, and B sensors. Accordingly, lens apparatus 30 provides a scanner resolution of approximately 400 pixels per centimeter for a film image up to 20 centimeters wide, 800 pixels per centimeter for a film image up to 10 centimeters wide, and 1400 pixels per centimeter for an image 5.7 centimeters wide.

The invention has been described in detail with reference to the figures; however, it will be appreciated that variations and modifications are possible within the spirit and scope of the invention. Patentable features disclosed but not claimed herein are disclosed and claimed in U.S. Pat. application Ser. No. 241,685, entitled LIGHT-CONDITIONING APPARATUS FOR AN IMAGE SCANNER ILLUMINATION SYSTEM, filed Sept. 8, 1988.

What is claimed is:

1. Image scanning apparatus for converting an image recorded on a photographic film to an electrical signal modulated in accordance with such image, said apparatus comprising:

(a) a drum rotatable about an axis and having an aperture arranged for movement along a surface of revolution of said drum;

(b) a mechanism adapted to clamp an image-bearing film to said drum with the film image aligned with the aperture for rotation therewith substantially in a surface of revolution of said drum;

(c) a source of diffuse light disposed between the axis of rotation of said drum and its surface of revolution, said diffuse light source defining an elongate light-emitting slot of width, w, located a distance, d, from the surface of revolution of said drum for forming a relatively narrow line of diffuse illumination extending from one side to the opposing side of the aperture orthogonal to the direction of rotation of said drum, to project the narrow line of diffuse illumination directly onto the image-bearing film orthogonal to the direction at which the film is movably carried on the surface of revolution of said drum, the distance d being approximately one-half the width w so that light emitted through the slot impinges on the film plane over a wide range of incident angles to reduce the influence of scratches and dust on the film image;

(d) a stepper motor for rotating said drum in a stepwise manner about its axis of rotation, to move the image-bearing portion of the film orthogonally through the line of diffuse illumination in a series of discrete steps each of which corresponds substantially to the width of the relatively narrow line diffuse illumination at the surface of revolution of said drum;

(e) a linear array of a given number of light-responsive elements disposed external to the surface of revolution of said drum; and (f) focusable lens apparatus, interposed between the surface of revolution of said drum and said linear array, selectively positionable as a function of the size of the film image, to focus the portion of the line of diffuse light that is modulated in accordance with the film image illuminated onto said given number of light responsive elements of said linear array, thereby providing variable magnification of said image sensor to adjust the resolution of the film image scanned in a direction corresponding to the orientation of the line of diffuse illumination.

* * * * *